J. M. BAKER.
PLANTER.
APPLICATION FILED OCT. 28, 1912.
1,080,802.
Patented Dec. 9, 1913.
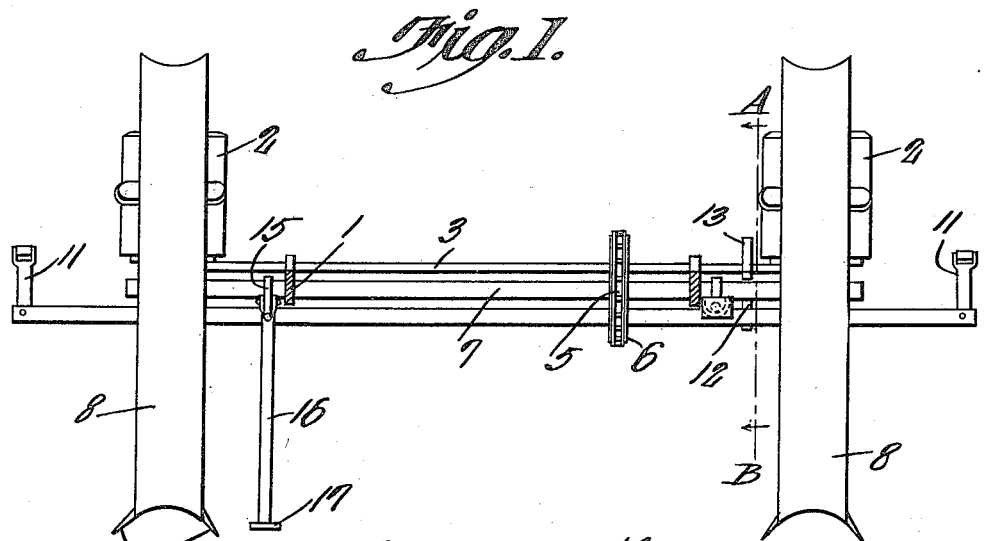
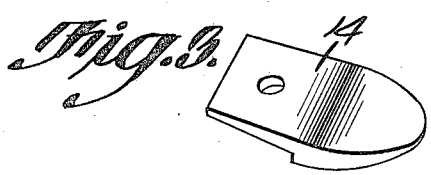
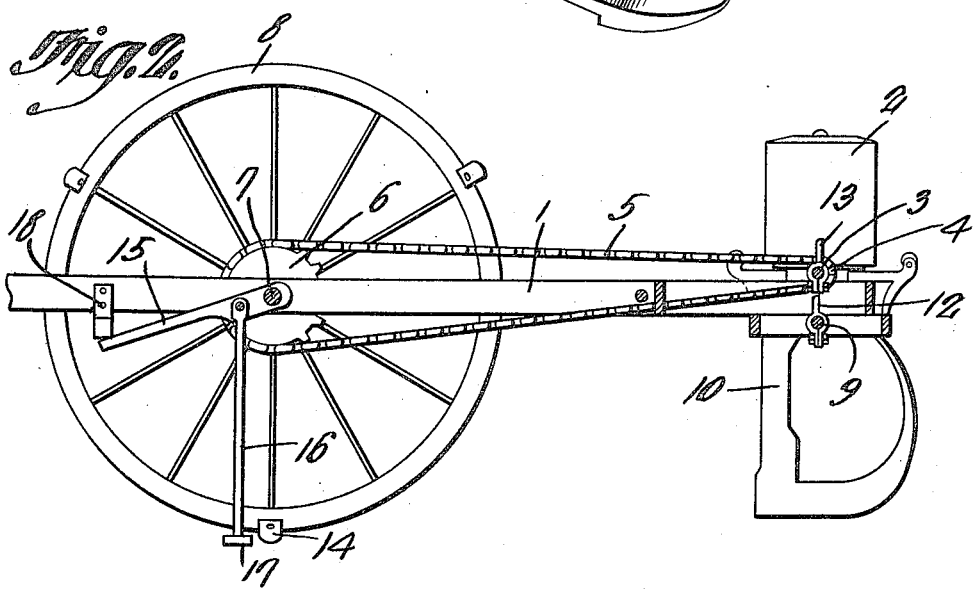
Witnesses
J. M. Baker Inventor

UNITED STATES PATENT OFFICE.

JOHN M. BAKER, OF NELSON, MISSOURI.

PLANTER.

1,080,802.

Specification of Letters Patent.  Patented Dec. 9, 1913.

Application filed October 28, 1912. Serial No. 728,191.

*To all whom it may concern:*

Be it known that I, JOHN M. BAKER, a citizen of the United States, residing at Nelson, in the county of Saline and State of Missouri, have invented a new and useful Planter, of which the following is a specification.

This invention relates to planters, its object being to provide means whereby motion may be transmitted to the feed or dropping mechanism of the planter from the supporting wheels without the necessity of using a check wire such as commonly employed.

A further object is to provide marking devices of novel form carried by one of the wheels, there being means combined with the machine whereby the marker carrying wheel can be raised out of contact with the soil and rotated so as to bring one of the markers into alinement with the row of marks previously formed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a rear elevation of a planter having the present improvements combined therewith, the rearwardly extending portion of the planter frame being shown in section. Fig. 2 is a section on line A—B Fig. 1. Fig. 3 is a detail view of one of the markers.

Referring to the figures by characters of reference 1 designates the frame of the planter, the same being provided with seed hoppers 2 such as are commonly used. The dropping mechanisms within these hoppers have not been illustrated for the reason that they constitute no part of the present invention and can be of the usual or any preferred type. The mechanism is actuated by an operating shaft 3 extending transversely of the frame 1 and provided with a sprocket 4. This sprocket receives motion, through a chain 5, from a sprocket 6 secured to the revoluble axle 7 of the machine, this axle being rotated by the supporting wheels 8. Another shaft 9 is arranged under and parallel with the shaft 3 and controls the valves (not shown) within the seed boots 10. This shaft 9 is similar to the one ordinarily provided in check row planters, the same being provided with the usual tripping devices 11 at the ends thereof and which are engaged by a check wire. A finger 12 is secured to the shaft 9 and projects into the path of a tripping finger 13 which is secured to the shaft 3. Thus it will be seen that once during each rotation of the shaft 3, the finger 13 is brought into contact with the finger 12 and causes the shaft 9 to rotate and thus open the valves (not shown) connected thereto. The parts are so proportioned that the shaft 9 will be actuated at desired intervals, the rotation of the wheels 8 and axle 7 causing power to be transmitted through chain 5 to shaft 3 which, in turn, drives the seed dropping mechanism.

For the purpose of marking the soil and likewise bringing the newly planted hills in alinement with the rows previously planted, novel forms of markers are provided upon one of the supporting wheels 8 and special means are employed whereby said wheel can be lifted out of contact with the ground to permit rotation of the wheel while the machine is stationary. The markers are preferably arranged in pairs and each consists of a bowed plate 14 extending beyond one side of the wheel and fastened to the rim of the wheel in any suitable manner, as by means of bolts. Any desired number of these markers can be placed on the wheel, the power transmitting mechanism being proportioned to deposit seeds at points which will be subsequently indicated by the markers on the wheel which covers the deposited seeds.

Connected to the axle 7 is a lever 15 to which is pivoted a hanger 16 having a broad foot 17. When lever 15 is lifted out of normal position, it can be swung into engagement with a supporting bracket 18 secured to the frame 1. With the lever thus located, the foot 17 is held out of contact with the soil.

In starting to plant a row it is desirable of course to have the markers 14 on the wheel 8 aline with marks previously formed in the soil. Thus, before starting along a row, the machine is held stationary after which lever 15 is disconnected from bracket 18 and swung downwardly so as to cause the foot 17 to press against the soil. This will elevate axle 7 and lift the wheel 8 out of contact with the ground. The wheel can then be rotated until one of the markers thereon will be brought to a position to engage the soil at a point in alinement with a row of marks previously formed. The lever 15 can then be raised, thus permitting the wheel 8 to gravitate into engagement with the soil. By then propelling the machine forwardly, wheel 8 will rotate axle 7 and motion will be transmitted to the dropping and valve mechanism in the manner hereinbefore described.

Importance is attached to the fact that, by means of the elevating mechanism described, the machine can be readily adjusted whenever desired so as to plant seeds in alinement with transverse rows previously planted.

As shown in Fig. 2, when lever 15 is swung downwardly to active position, it can be moved under the bracket 18 and will thus hold the rear end of the machine elevated during the adjustment of the wheel.

It will be noted that fingers 13 and 12 are connected to their respective shafts by means of clamps. Thus it is possible to adjust the fingers to any desired positions upon the shafts.

What is claimed is:—

A planter including an operating shaft, a valve shaft, coöperating fingers upon the shafts for transmitting intermittent movement from the operating shaft to the valve shaft, supporting wheels, marking plates arranged in pairs and secured to the rim of one of the supporting wheels, said plates extending laterally beyond the rim, means for transmitting motion from said wheel to the operating shaft, a lever pivotally connected to the axle of the supporting wheel, a hanger depending therefrom, means for engaging the lever to hold the hanger out of contact with the soil, said lever being movable downwardly to force the hanger against the soil and elevate the supporting wheel, and means for holding the lever in its lower position.

In testimony that I claim the foregoing as my own, I have hereto affixed my signature in the presence of two witnesses.

JOHN M. BAKER.

Witnesses:
B. E. STAPLES,
L. M. HAYNIE.

---

Copies of this patent may be obtained for five cents each, by addressing the "Commissioner of Patents, Washington, D. C."